No. 665,980. Patented Jan. 15, 1901.
J. ROCHE.
FLYING TOY.
(Application filed Apr. 20, 1900.)
(No Model.)
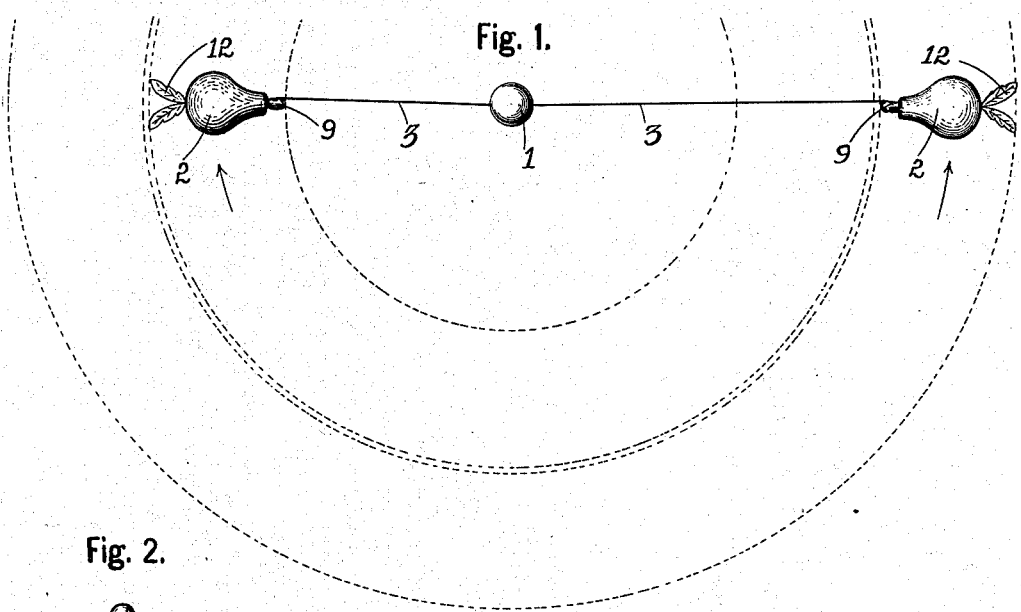
Fig. 1.
Fig. 2.
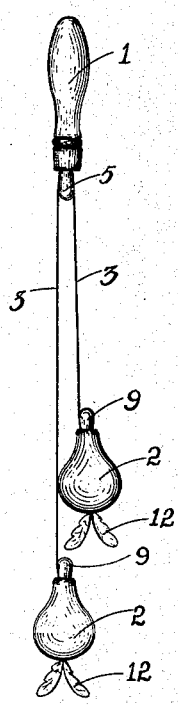
Fig. 3.
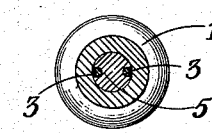
Fig. 5.
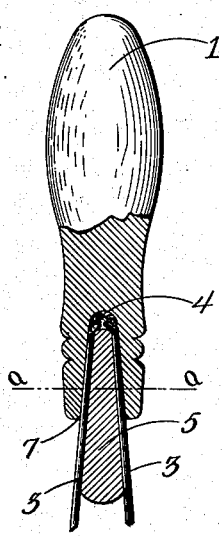
Fig. 4.
Fig. 6.
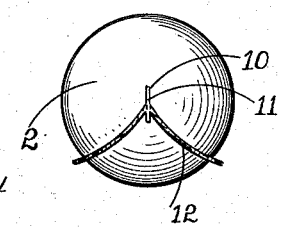
Witnesses.
L. M. Billings.
G. A. Neubauer.
Inventor.
John Roche.
By A. J. Sangster, Attorney.

UNITED STATES PATENT OFFICE.

JOHN ROCHE, OF BUFFALO, NEW YORK, ASSIGNOR OF ONE-HALF TO JEROME S. MOORE, OF SAME PLACE.

FLYING TOY.

SPECIFICATION forming part of Letters Patent No. 665,980, dated January 15, 1901.

Application filed April 20, 1900. Serial No. 13,570. (No model.)

*To all whom it may concern:*

Be it known that I, JOHN ROCHE, a citizen of the United States, residing at Buffalo, in the county of Erie and State of New York, have invented certain new and useful Improvements in Flying Toys, of which the following is a specification.

My invention relates to a simple, cheap, and amusing toy; and it consists of two devices each suspended from the end of a flexible cord, the opposite end being attached to a handle, the object being to rotate the balls or other devices oppositely to each other, all of which will be fully and clearly hereinafter described and claimed, reference being had to the accompanying drawings, in which—

Figure 1 represents a plan view of my improved toy, the circular path of travel of each device being partially indicated by dotted lines and the opposite direction of travel by arrows. Fig. 2 is a side elevation of my improved toy. Fig. 3 is an enlarged section through the handle on or about line *a a*, Fig. 5. Fig. 4 is an enlarged detached view of the handle-fastening pin. Fig. 5 is an enlarged view of the handle, partly in section, to show the manner of fastening the ends of the cord therein. Fig. 6 is an enlarged top view of one of the devices.

In referring to the drawings in detail like numerals designate like parts.

The handle 1 is preferably formed of wood, which is the cheapest, lightest, and best material for the purpose, and is preferably in the form shown in the drawings. The rotating devices or objects 2 may be made in the pear-shaped form shown in Figs. 1 and 2, or they may be made in the form of a ball or equivalent form without departing from the scope of my invention. These devices or objects are each connected to one end of a cord 3, which is preferably formed of india-rubber or other elastic material. The cords 3 are fastened at their opposite ends to the handle and preferably by providing the handle with a recess or depression 4, in which the ends of the cords after being knotted, as shown in Fig. 5, are placed, and a plug or pin 5, having a longitudinal groove 6 on each side arranged opposite to each other to form a seat for a portion of the cord above the knot, is driven into the recess or depression 4 to secure the cord ends in place. The mouth 7 of the recess or depression 4 is preferably flaring or bell-shaped to prevent chafing the cord when manipulating the toy. The cord ends are preferably fastened to the devices or objects in a similar manner, the devices or objects being provided with recesses in which the knotted ends of the cord are secured by the plugs or pins 9. It will be noticed that the ends of the plugs 5 and 9 are rounded, so that they will not present any sharp corners to cut or chafe the cords. The devices are each provided with a narrow slot or slit 10, in which the projecting portion 11 of a pair of metal wings 12 is rigidly mounted. These wings serve to prevent the devices or objects from turning or rotating sidewise while in operation, and thus steady the movement around the central handle and also produce a whistling, buzzing, or singing sound when whirled through the air. One of these cords 3 is longer than the other, so that the devices or objects travel in different circles and cannot strike each other.

To operate the toy, one of the devices or objects is rotated in one direction and the other is started in the opposite direction, the regularity and rapidity of the rotation being controlled by the movement of the handle in the hands of the operator.

The elastic cord is preferable, as the devices automatically adjust themselves to each other and the movement of the handle owing to the extensible nature of the cord and do not require to be started at exactly opposite points to operate, as in the toy provided with non-stretchable cords.

I claim as my invention—

1. A toy comprising a handle, two devices, and cords connecting the devices to the handle, said devices being adapted to be rotated in the same plane and in opposite directions, and one of said cords being shorter than the other; whereby each device has a different circular path of travel to prevent said devices striking each other while passing, as set forth.

2. A toy comprising a handle having a recess, two oppositely-rotating devices, a pair of wings rigidly attached to each device, two cords each connected at one end to one of said devices, and a plug or pin for fastening the opposite ends of said cords in the recess in the handle, as set forth.

3. A toy comprising a handle having a recess, two devices each having a recess and a slit, a pair of wings having a projecting portion rigidly inserted in the slit in each device, two cords having knotted ends inserted respectively in the recesses in the handle and devices, and plugs or pins for fastening said cord ends in place, as set forth.

4. A toy comprising a handle having a recess, two devices each having a recess and a slit, a pair of wings having a projecting portion rigidly inserted in the slit in each device, two cords having knotted ends inserted respectively in the recesses in the handle and devices and plugs or pins for fastening said cord ends in place; the handle-fastening plug or pin having opposite longitudinal grooves, for the purposes specified.

JOHN ROCHE.

Witnesses:
JACOB SUTER,
L. M. BILLINGS.